US009432330B2

(12) United States Patent
Liu et al.

(10) Patent No.: US 9,432,330 B2
(45) Date of Patent: Aug. 30, 2016

(54) DATA INTERACTION METHOD, APPARATUS, AND SYSTEM

(71) Applicant: Huawei Technologies Co., Ltd., Shenzhen, Guangdong (CN)

(72) Inventors: Chang Liu, Wuhan (CN); Jun Cai, Shenzhen (CN); Haobo Zhang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 174 days.

(21) Appl. No.: 14/310,727

(22) Filed: Jun. 20, 2014

(65) Prior Publication Data

US 2014/0355614 A1 Dec. 4, 2014

Related U.S. Application Data

(63) Continuation of application No. PCT/CN2013/084145, filed on Sep. 25, 2013.

(30) Foreign Application Priority Data

May 29, 2013 (CN) .......................... 2013 1 0206758

(51) Int. Cl.
*H04L 29/12* (2006.01)
*H04L 29/06* (2006.01)

(52) U.S. Cl.
CPC ....... *H04L 61/2589* (2013.01); *H04L 61/2575* (2013.01); *H04L 69/169* (2013.01); *H04L 61/2514* (2013.01)

(58) Field of Classification Search
CPC ........... H04L 61/2589; H04L 61/2575; H04L 61/2514; H04L 69/169
USPC ........................................................ 370/392
See application file for complete search history.

(56) References Cited

U.S. PATENT DOCUMENTS 7,664,048 B1  2/2010 Yung et al.
8,224,985 B2 * 7/2012 Takeda ................ H04L 61/2564
                                                    709/223

(Continued)

FOREIGN PATENT DOCUMENTS

CN         1805388 A      7/2006
CN       101030865 A      9/2007

(Continued)

OTHER PUBLICATIONS

S. Perreault, et al., "Traversal Using Relays around NAT (TURN) Extensions for TCP Allocations", Internet Engineering Task Force (IETF), Nov. 2010, 13 pages.

(Continued)

*Primary Examiner* — Ricky Ngo
*Assistant Examiner* — Richard Chang

(57) ABSTRACT

A data interaction method is provided, which includes: sending simultaneously an address detection request for a UDP channel and an address detection request for a TCP channel; and when both address detection for the UDP channel and address detection for the TCP channel fail, sending an address detection request for an HTTP channel; when detection of at least one channel succeeds, collecting two types of addresses corresponding to each channel in the at least one channel; performing address exchange and address matching with a peer client host; and performing channel connectivity detection based on matched addresses, and selecting a channel with a highest priority from channels on which connectivity detection is successful for data interaction with the peer client host. Therefore, efficiency of traversing a NAT host during address detection is improved.

8 Claims, 10 Drawing Sheets

(56) References Cited

U.S. PATENT DOCUMENTS

| | | | |
|---|---|---|---|
| 2005/0195799 A1 | 9/2005 | Burne et al. | |
| 2012/0054851 A1 | 3/2012 | Piazza et al. | |
| 2012/0166593 A1* | 6/2012 | Yoon | H04L 61/15 709/219 |

FOREIGN PATENT DOCUMENTS

| | | |
|---|---|---|
| CN | 101447861 A | 6/2009 |
| CN | 101594673 A | 12/2009 |
| CN | 101800781 A | 8/2010 |
| CN | 101834685 A | 9/2010 |
| CN | 101873243 A | 10/2010 |
| CN | 101873324 A | 10/2010 |
| CN | 101931481 A | 12/2010 |
| CN | 201667660 U | 12/2010 |
| CN | 101938532 A | 1/2011 |
| CN | 102013967 A | 4/2011 |
| CN | 201789508 U | 4/2011 |
| CN | 102415025 A | 4/2012 |
| CN | 102685262 A | 9/2012 |
| CN | 102904813 A | 1/2013 |
| JP | 2009206657 A | 9/2009 |
| JP | 2010-199761 A | 9/2010 |
| JP | 2011-049977 A | 3/2011 |
| WO | WO 2008/102177 A2 | 8/2008 |

OTHER PUBLICATIONS

R. Mahy, et al., "Traversal Using Relays around NAT (TURN): Relay Extensions to Session Traversal Utilities for NAT (STUN)", Internet Engineering Task Force (IETF), Apr. 2010, 67 pages.

* cited by examiner

US 9,432,330 B2

DATA INTERACTION METHOD, APPARATUS, AND SYSTEM

CROSS-REFERENCE TO RELATED APPLICATIONS

This application is a continuation of International Application No. PCT/CN2013/084145, filed on Sep. 25, 2013, which claims priority to Chinese Patent Application No. 201310206758.6, filed on May 29, 2013, both of which are hereby incorporated by reference in their entireties.

TECHNICAL FIELD

The present invention relates to the field of communications technologies, and in particular, to a data interaction method, apparatus, and system.

BACKGROUND

Accessing the Internet by adopting network address translation (Network Address Translation, NAT) is already a major network access manner for companies, universities, or government institutions. By disposing a NAT host at an exit of a local area network, on one hand, Internet Protocol (Internet Protocol, IP) address resources can be saved, and on the other hand, security inside the local area network can be ensured and access permissions of internal staff can be controlled. However, the existence of the NAT host also becomes an obstacle for common network communications, and during communications, a capability of traversing the NAT host is necessarily required, so as to implement end-to-end data transmission.

Currently, many solutions are already used to resolve a problem of traversing the NAT host, and what are widely applied are session traversal utilities for NAT (Session Traversal Utilities for NAT, STUN), traversal using relays around NAT (Traversal Using Relays around NAT, TURN), interactive connectivity establishment (Interactive Connectivity Establishment, ICE), and the like. These methods are all provided solutions to address mapping and a filtering rule of the NAT host for an external data packet. However, when the NAT host limits an outbound communication port or an outbound communication protocol, none of the foregoing methods works.

Because the NAT generally allows Hypertext Transfer Protocol (Hypertext transfer protocol, HTTP) communications, the prior art proposes an HTTP Tunnel technology.

The HTTP Tunnel technology proposes that a user communication data packet is encapsulated in an HTTP format, an HTTP communication behavior is simulated, the data packet is sent to an extranet relay device, and the relay device recovers the data packet and forwards the data packet to a destination address.

Network environment detection in the HTTP Tunnel technology is briefly described as follows:

A client sends a detection request packet to a relay device of a public network by using the User Datagram Protocol (User Datagram Protocol, UDP). If a response is received by the client successfully, it indicates that the NAT host allows UDP communication over the port, and a next step is performed. Then, the detection is terminated; if the response is not received by the client successfully, the next step cannot be performed.

The client sends a detection request packet to the relay device of the public network by using the Transmission Control Protocol (Transmission Control Protocol, TCP). If a response is received by the client successfully, it indicates that the NAT host allows TCP communication over the port, and a next step is performed. Then, the detection is terminated; if the response is not received by the client successfully, the next step cannot be performed.

If both the UDP and the TCP fail, and only an 80 port or HTTP packet communication is allowed, an HTTP Tunnel module is started, and an HTTP channel is established between the client and the relay device to implement unimpeded data communication; finally, if the detection fails, the whole traversing the NAT host process fails.

The inventor of the present invention finds that: The HTTP Tunnel technology uses a signal-step detection manner, and next-step detection can be started only when a result of previous-step detection is obtained, which results in that if the start of the HTTP module consumes an excessively long time, the NAT host is traversed at a very low speed.

SUMMARY

Embodiments of the present invention provide a data interaction method, which can improve efficiency of traversing a NAT host during address detection, thereby shortening an initiation delay of data interaction between two client hosts. The embodiments of the present invention further provide a corresponding apparatus and system.

A first aspect of the present invention provides a data interaction method, including:

sending simultaneously an address detection request for a User Datagram Protocol UDP channel and an address detection request for a Transmission Control Protocol TCP channel; and when both address detection for the UDP channel and address detection for the TCP channel fail, sending an address detection request for a Hypertext Transfer Protocol HTTP channel;

when address detection for at least one channel succeeds, collecting two types of addresses corresponding to each channel in the at least one channel, where the two types of addresses include a mapping address allocated by a network address translation NAT host at an outermost layer of each channel and a relay address of a local relay device;

performing address exchange and address matching with a peer client host; and performing channel connectivity detection based on matched addresses, and selecting a channel with a highest priority from detected effective channels for data interaction with the peer client host.

With reference to the first aspect, in a first possible implementation manner, before the step of performing address exchange and address matching with a peer client host, the method further includes:

obtaining host addresses of three types of channels of a local client host, where the host addresses of the three types of channels include a host address of the UDP channel, a host address of the TCP channel, and a host address of the HTTP channel; and correspondingly, the performing address exchange and address matching with a peer client host includes:

exchanging and matching the host addresses of the three types of channels of the local client host and the collected two types of addresses, with host addresses of the three types of channels of the peer client host and the two types of addresses collected by the peer client host.

With reference to the first possible implementation manner of the first aspect, in a second possible implementation manner, the exchanging and matching the host addresses of the three types of channels of the local client host and the collected two types of addresses, with host addresses of the three types of channels of the peer client host and the two types of addresses collected by the peer client host includes:

exchanging the host address of the UDP channel of the local client host, the host address of the TCP channel of the local client host, the host address of the HTTP channel of the local client host, the mapping address that is collected by the local client host and that is allocated by the network address translation NAT host at the outermost layer of each channel in the at least one channel, and the relay address that is of the local relay device and that is collected by the local client host, with a host address of the UDP channel of the peer client host, a host address of the TCP channel of the peer client host, a host address of the HTTP channel of the peer client host, a mapping address that is collected by the peer client host and that is allocated by a NAT host at an outermost layer, and a relay address that is of a peer relay device and that is collected by the peer client host; and matching the host address of the UDP channel of the local client host, the host address of the TCP channel of the local client host, the host address of the HTTP channel of the local client host, the mapping address that is collected by the local client host and that is allocated by the network address translation NAT host at the outermost layer of each channel in the at least one channel, and the relay address that is of the local relay device and that is collected by the local client host, with a host address of the UDP channel of the peer client host, a host address of the TCP channel of the peer client host, a host address of the HTTP channel of the peer client host, a mapping address that is collected by the peer client host and that is allocated by a NAT host at an outermost layer, and a relay address that is of a peer relay device and that is collected by the peer client host.

With reference to the second possible implementation manner of the first aspect, in a third possible implementation manner, the performing channel connectivity detection based on matched addresses, and selecting a channel with a highest priority from detected effective channels for data interaction with the peer client host includes:

detecting connectivity of a UDP channel between the host address of the UDP channel of the local client host and the host address of the UDP channel of the peer client host, wherein the host address of the UDP channel of the local client host and the host address of the UDP channel of the peer client host are matched; and when the UDP channel is connected successfully, selecting the UDP channel as the channel that has the highest priority when the local client host and the peer client host perform data interaction.

With reference to the first aspect, and any one of the first to the third possible implementation manners of the first aspect, in a fourth possible implementation manner, the method further includes:

during address exchange, performing the address exchange with the peer client host by using a proxy server.

A second aspect of the present invention provides a data interaction method, including:

receiving an address detection request sent by a local client host;

collecting, according to a packet type of the address detection request, two types of addresses corresponding to the packet type, where the two types of addresses include a mapping address allocated by a network address translation NAT host at an outermost layer and a relay address of a local relay device; and sending, to the local client host, the collected two types of addresses corresponding to the packet type, so that the local client host and a peer client host perform address exchange and address matching, and the local client host perform, based on matched addresses, channel connectivity detection and select a channel with a highest priority from detected effective channels for data interaction with the peer client host.

With reference to the second aspect, in a first possible implementation manner, the method further includes:

receiving data sent by the local client host, where a destination end address of the data indicates that a receiver of the data is the peer client host;

converting the data to data in a UDP format; and sending the data in the UDP format to a peer relay device through a UDP channel between the local relay device and the peer relay device.

With reference to the second aspect, in a second possible implementation manner, the method further includes:

receiving data in a UDP format sent by a peer relay device;

determining a channel with a highest priority between the local relay device and the local client host;

when the channel with the highest priority between the local relay device and the local client host is a non-UDP channel, converting the data from the UDP format to a format corresponding to the channel with the highest priority; and sending data in a converted format to the local client host.

A third aspect of the present invention provides a client host, including:

a sending unit, configured to send simultaneously an address detection request for a User Datagram Protocol UDP channel and an address detection request for a Transmission Control Protocol TCP channel; and when both address detection for the UDP channel and address detection for the TCP channel fail, sending an address detection request for a Hypertext Transfer Protocol HTTP channel;

a receiving unit, configured to: when address detection for at least one channel succeeds, collect two types of addresses corresponding to each channel in the at least one channel, where the two types of addresses include a mapping address allocated by a network address translation NAT host at an outermost layer and a relay address of a local relay device;

an address processing unit, configured to perform address exchange and address matching on the addresses received by the receiving unit with a peer client host; and a channel processing unit, configured to perform channel connectivity detection based on the addresses matched by the address processing unit, and select a channel with a highest priority from detected effective channels for data interaction with the peer client host.

With reference to the third aspect, in a first possible implementation manner, the client host further includes: an address obtaining unit; where the address obtaining unit is configured to obtain host addresses of three types of channels of the client host which serves as a local client host, where the host addresses of the three types of channels include a host address of the UDP channel, a host address of the TCP channel, and a host address of the HTTP channel; and the address processing unit is configured to exchange and match the host addresses of the three types of channels of the local client host and the collected two types of addresses, with host addresses of the three types of channels of the peer client host and the two types of addresses collected by the peer client host.

With reference to the first possible implementation manner of the third aspect, in a second possible implementation manner:

the address processing unit is further configured to exchange the host address of the UDP channel of the local client host, the host address of the TCP channel of the local client host, the host address of the HTTP channel of the local client host, the mapping address that is collected by the local client host and that is allocated by the network address translation NAT host at the outermost layer of each channel in the at least one channel, and the relay address that is of the local relay device and that is collected by the local client host, with a host address of the UDP channel of the peer client host, a host address of the TCP channel of the peer client host, a host address of the HTTP channel of the peer client host, a mapping address that is collected by the peer client host and that is allocated by a NAT host at an outermost layer, and a relay address that is of a peer relay device and that is collected by the peer client host; and match the host address of the UDP channel of the local client host, the host address of the TCP channel of the local client host, the host address of the HTTP channel of the local client host, the mapping address that is collected by the local client host and that is allocated by the network address translation NAT host at the outermost layer of each channel in the at least one channel, and the relay address that is of the local relay device and that is collected by the local client host, with a host address of the UDP channel of the peer client host, a host address of the TCP channel of the peer client host, a host address of the HTTP channel of the peer client host, a mapping address that is collected by the peer client host and that is allocated by a NAT host at an outermost layer, and a relay address that is of a peer relay device and that is collected by the peer client host.

With reference to the second possible implementation manner of the third aspect, in a third possible implementation manner:

the channel processing unit is configured to detect connectivity of a UDP channel between the host address of the UDP channel of the local client host and the host address of the UDP channel of the peer client host, wherein the host address of the UDP channel of the local client host and the host address of the UDP channel of the peer client host are matched; and when the UDP channel is connected successfully, select the UDP channel as a channel that has a highest priority when the local client host and the peer client host perform data interaction.

With reference to the third aspect, and any one of the first to the third possible implementation manners of the third aspect, in a fourth possible implementation manner:

the address processing unit is further configured to: during address exchange, perform the address exchange with the peer client host by using a proxy server.

A fourth aspect of the present invention provides a relay device, including:

a receiving unit, configured to receive an address detection request sent by a local client host;

an address collecting unit, configured to collect, according to a packet type of the address detection request received by the receiving unit, two types of addresses corresponding to the packet type, where the two types of addresses include a mapping address allocated by a network address translation NAT host at an outermost layer and a relay address of the relay device which serves as a local relay device; and a sending unit, configured to send, to the local client host, the two types of addresses which correspond to the packet type and are collected by the address collecting unit, so that the local client host and a peer client host perform address exchange and address matching, and the local client host perform, based on matched addresses, channel connectivity detection and select a channel with a highest priority from detected effective channels for data interaction with the peer client host.

With reference to the fourth aspect, in a first possible implementation manner, the relay device further includes: a first format converting unit, where the receiving unit is further configured to receive data sent by the local client host, where a destination end address of the data indicates that a receiver of the data is the peer client host;

the first format converting unit is configured to convert the data received by the receiving unit to data in a UDP format; and the sending unit is configured to send the data in the UDP format to a peer relay device through a UDP channel between the local relay device and the peer relay device.

With reference to the fourth aspect, in a second possible implementation manner, the relay device further includes: a determining unit and a second format converting unit, where the receiving unit is further configured to receive data in a UDP format sent by a peer relay device;

the determining unit is configured to determine a channel with a highest priority between the local relay device and the local client host;

the second format converting unit is configured to: when the determining unit determines that the channel with the highest priority between the local relay device and the local client host is a non-UDP channel, convert the data from the UDP format to a format corresponding to the channel with the highest priority; and the sending unit is configured to send, to the local client host, the data whose format is converted by the second format converting unit.

A fifth aspect of the present invention provides a data interaction system, including: a first client host, a second client host, a first network address translation NAT host, a second NAT host, a first relay device, and a second relay device, where the first client host, the first NAT host, and the first relay device belong to a first network;

the second client host, the second NAT host, and the second relay device belong to a second network;

the first NAT host is a NAT host at an outermost layer in the first network, and allocates a mapping address to the first client host when receiving an address detection request sent by the first client host;

the second NAT host is a NAT host at an outermost layer in the second network, and allocates a mapping address to the second client host when receiving an address detection request sent by the second client host;

the first client host and the second client host are each the client host according to the foregoing technical solution; and the first relay device and the second relay device are each the relay device according to the foregoing technical solution.

A sixth aspect of the present invention provides a data interaction system, including: a first client host, a second client host, a network address translation NAT host, and a relay device, where the first client host and the second client host belong to a same network;

the NAT host is a NAT host at an outermost layer of the network where the first client host and the second client host are located, and allocates a mapping address to at least one of the first client host and the second client host when receiving an address detection request sent by at least one of the first client host and the second client host;

the first client host and the second client host are each the client host according to the foregoing technical solution; and the relay device is the relay device according to the foregoing technical solution.

In the embodiments of the present invention, an address detection request for a User Datagram Protocol UDP channel and an address detection request for a Transmission Control Protocol TCP channel are sent simultaneously; and when both address detection for the UDP channel and address detection for the TCP channel fail, an address detection request for a Hypertext Transfer Protocol HTTP channel is sent; when detection of at least one channel succeeds, two types of addresses corresponding to each channel in the at least one channel are collected, where the two types of addresses include a mapping address allocated by a network address translation NAT host at an outermost layer of each channel and a relay address of a local relay device; address exchange and address matching are performed with a peer client host; and channel connectivity detection is performed based on matched addresses, and a channel with a highest priority is selected from detected effective channels for data interaction with the peer client host. Therefore, compared with a single-step detection manner in the prior art, in the embodiments of the present invention, address detection is performed in a manner of sending simultaneously the address detection request for the User Datagram Protocol UDP channel and the address detection request for the Transmission Control Protocol TCP channel, which improves efficiency of traversing a NAT host during address detection, thereby shortening an initiation delay of data interaction between two client hosts.

BRIEF DESCRIPTION OF THE DRAWINGS

To describe the technical solutions in the embodiments of the present invention more clearly, the following briefly introduces accompanying drawings required for describing the embodiments. Apparently, the accompanying drawings in the following description show merely some embodiments of the present invention, and a person skilled in the art may still derive other drawings from these accompanying drawings without creative efforts.

DETAILED DESCRIPTION

Embodiments of the present invention provide a data interaction method, which can improve efficiency of traversing a NAT host during address detection, thereby shortening an initiation delay of data interaction between two client hosts. The embodiments of the present invention further provide a corresponding apparatus and system. Detailed description is provided in the following.

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person skilled in the art based on the embodiments of the present invention without creative efforts shall fall within the protection scope of the present invention.

Figure 1:
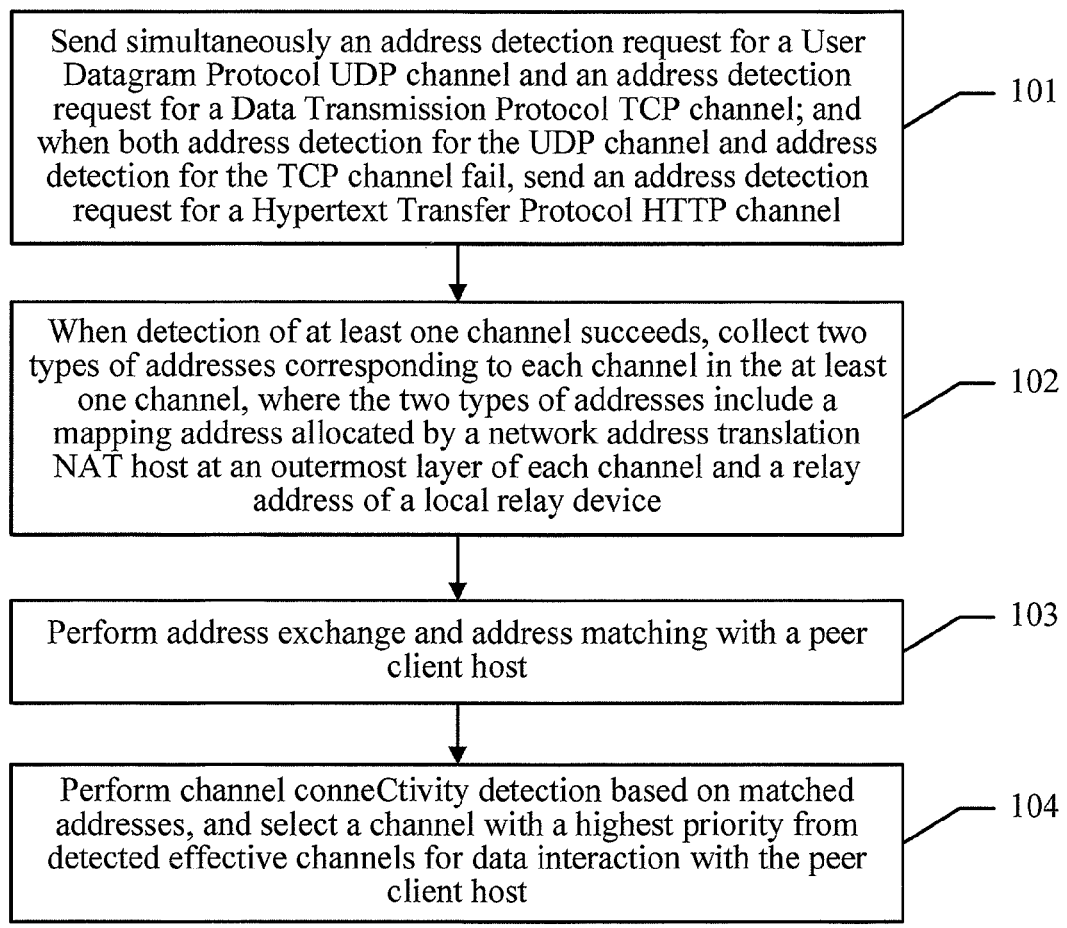
FIG. 1 is a schematic flowchart of a data interaction method according to an embodiment of the present invention.

Referring to FIG. 1, in an embodiment of a data interaction method according to an embodiment of the present invention, an execution body of the data interaction method may be a client host, where the client host herein may be, for example, a device such as a personal computer (personal computer, PC), a mobile phone, or a personal digital assistant (Personal Digital Assistant, PDA). The method in the embodiment of the present invention may include:

101: Send simultaneously an address detection request for a User Datagram Protocol UDP channel and an address detection request for a Transmission Control Protocol TCP channel; and when both address detection for the UDP channel and address detection for the TCP channel fail, send an address detection request for a Hypertext Transfer Protocol HTTP channel.

A client may establish three types of channels, namely a User Datagram Protocol (User Datagram Protocol, UDP) channel, a Data Transmission Protocol (Transmission Control Protocol, TCP) channel, and a Hypertext Transfer Protocol (Hypertext Transfer Protocol, HTTP) channel. A client host creates host addresses of the three types of channels.

Because the UDP channel has a highest priority, the TCP channel has a secondary priority, and the HTTP channel has a lowest priority, when any one of the UDP channel and the TCP channel can be used, the HTTP channel does not need to be used. The HTTP channel is used only when neither the UDP channel nor the TCP channel can be used.

102: When detection of at least one channel succeeds, collect two types of addresses corresponding to each channel in the at least one channel, where the two types of addresses include a mapping address allocated by a network address translation NAT host at an outermost layer of each channel and a relay address of a local relay device.

There may be multi-layer NAT hosts in a network where the client host is located. An address detection process is as follows: The client host sends an address detection request, the address detection request traverses the NAT hosts in the network one by one, and the NAT hosts are successfully traversed only when a NAT host at an outermost layer is traversed. Actually, each time the detection request traverses a NAT host at one layer, the detection request carries a mapping address allocated by the NAT host, and when the detection request traverses a NAT host at a next layer, the mapping address allocated by the NAT host at the previous layer is replaced with a mapping address allocated by this NAT host. Therefore, when the detection request arrives at a relay device, the relay device only collects a mapping address allocated by the NAT host at the outermost layer.

When one of the UDP detection request and the TCP detection request traverses the NAT host successfully, the HTTP detection request is not sent, and therefore, there are four situations as follows: In a first situation, the UDP detection request traverses the NAT host successfully, and a mapping address allocated by a network address translation NAT host at an outermost layer of the UDP channel and a relay address of the local relay device are collected; in a second situation, the TCP detection request traverses the NAT host successfully, and a mapping address allocated by a network address translation NAT host at an outermost layer of the TCP channel and a relay address of the local relay device are collected; in a third situation, the UDP detection request and the TCP detection request successfully traverse the NAT host simultaneously, and mapping addresses allocated by NAT hosts at outermost layers of the UDP channel and the TCP channel and a relay address of the local relay device are collected; and in a fourth situation, the UDP detection request and the TCP detection request traverse unsuccessfully simultaneously, while the HTTP detection request traverses the NAT host successfully, a mapping address allocated by a NAT host of the HTTP channel and a relay address of the local relay device providing a relay service are collected.

103: Perform address exchange and address matching with a peer client host.

104: Perform channel connectivity detection based on matched addresses, and select a channel with a highest priority from detected effective channels for data interaction with the peer client host.

A plurality of channels can be used after the connectivity detection, but the channel with the highest priority is selected for use.

Compared with a single-step detection manner in the prior art, in the embodiment of the present invention, address detection is performed in a manner of sending simultaneously an address detection request for a User Datagram Protocol UDP channel and an address detection request for a Transmission Control Protocol TCP channel, which improves efficiency of traversing a NAT host during address detection, thereby shortening an initiation delay of data interaction between two client hosts.

In the embodiment of the present invention, the initiation delay may be a startup delay of data interaction. For example, originally, before two client hosts perform data interaction, it needs to take 200 seconds to start interaction, and then, the initiation delay is 200 seconds. In the embodiment of the present invention, the startup delay of data interaction may be 100 seconds, and then, the initiation delay of the data interaction is shortened.

Optionally, based on the embodiment corresponding to FIG. 1, in another embodiment of the data interaction method provided in the embodiment of the present invention:

before the step of performing address exchange and address matching with a peer client host, the method may further include:

obtaining host addresses of three types of channels of a local client host, where the host addresses of the three types of channels include a host address of the UDP channel, a host address of the TCP channel, and a host address of the HTTP channel.

Correspondingly, the performing address exchange and address matching with a peer client host may include:

exchanging and matching the host addresses of the three types of channels of the local client host and the collected two types of addresses, with host addresses of the three types of channels of the peer client host and the two types of addresses collected by the peer client host.

In the embodiment of the present invention, in a same network, in a UDP channel, a TCP channel, and an HTTP channel from a client host to a relay device, each channel corresponds to three types of addresses. Respectively, for the UDP channel, the three types of addresses are a host address of the UDP channel of the client host, a mapping address allocated by a NAT host at an outermost layer to the UDP channel, and a relay address allocated by the relay device to the UDP channel; similarly, for the TCP channel, the three types of addresses are a host address of the TCP channel of the client host, a mapping address allocated by a NAT host at an outermost layer to the TCP channel, and a relay address allocated by the relay device to the TCP channel; and for the HTTP channel, the three types of addresses are a host address of the HTTP channel of the client host, a mapping address allocated by a NAT host at an outermost layer to the HTTP channel, and a relay address allocated by the relay device to the HTTP channel.

During the address exchange, the local client host and the peer client host exchange the host address of the UDP channel, the host address of the TCP channel, the host address of the HTTP channel, and the collected two types of addresses.

In the embodiment of the present invention, only when the HTTP channel is traversed successfully, the host address of the UDP channel and the host address of the TCP channel are added during the address exchange, thereby increasing diversity of channel options.

Optionally, based on the optional embodiment corresponding to FIG. 1, in an optional embodiment of the data interaction method provided in the embodiment of the present invention, the exchanging and matching the host addresses of the three types of channels of the local client host and the collected two types of addresses, with host addresses of the three types of channels of the peer client host and the two types of addresses collected by the peer client host may include:

exchanging and matching the host address of the UDP channel of the local client host, the host address of the TCP channel of the local client host, the host address of the HTTP channel of the local client host, and the mapping address allocated by the network address translation NAT host at the outermost layer of each channel in the at least one channel and the relay address of the local relay device, where the mapping address and the relay address are collected by the local client host, with a host address of the UDP channel of the peer client host, a host address of the TCP channel of the peer client host, a host address of the HTTP channel of the peer client host, and a mapping address allocated by a NAT host at an outermost layer and a relay address of a peer relay device, where the mapping address and the relay address are collected by the peer client host.

In the embodiment of the present invention, during address exchange, the host address of the UDP channel, the host address of the TCP channel, the host address of the HTTP channel are included. In this way, though the UDP detection request and the TCP detection request traverse unsuccessfully, when the HTTP detection request traverses successfully, the host address of the UDP channel of the local client host and the host address of the UDP channel of the peer client host can further be exchanged and matched, and the host address of the TCP channel of the local client host and the host address of the TCP channel of the peer client host can further be exchanged and matched.

In the embodiment of the present invention, because priorities of the UDP channel and the TCP channel are both higher than the priority of the HTTP channel, after the host address of the UDP channel of the local client host and the host address of the UDP channel of the peer client host are matched successfully, or after the host address of the TCP channel of the local client host and the host address of the TCP channel of the peer client host are matched successfully, the UDP channel or the TCP channel may be selected for data interaction, thereby improving a priority of a transmission channel during data interaction.

Optionally, based on the foregoing another optional embodiment, in another optional embodiment of the data interaction method provided in the embodiment of the present invention, the performing channel connectivity detection based on matched addresses, and selecting a channel with a highest priority from detected effective channels for data interaction with the peer client host may include:

detecting connectivity of a UDP channel between the host address of the UDP channel of the local client host and the host address of the UDP channel of the peer client host, wherein the host address of the UDP channel of the local client host and the host address of the UDP channel of the peer client host are matched; and when the UDP channel is connected successfully, selecting the UDP channel as the channel that has the highest priority when the local client host and the peer client host perform data interaction.

In the embodiment of the present invention, because the UDP channel has the highest priority and the TCP channel has a priority higher than that of the HTTP channel, connectivity of the UDP channel between the host address of the UDP channel of the local client host and the host address of the UDP channel of the peer client host is detected preferentially. When the UDP channel between the two hosts is connected successfully, the two client hosts select this UDP channel for data interaction. Differently, the HTTP channel further needs a relay device for forwarding.

In the embodiment of the present invention, during data interaction, there are a UDP address and a TCP address of a client host. In this way, though a NAT does not allow a packet in a UDP or TCP format to pass through, when two client hosts are located in a same network, data interaction may also be performed through the UDP channel or the TCP channel, and generally, the UDP channel is selected preferentially.

Optionally, based on the embodiment corresponding to FIG. 1 and any one of the optional embodiments corresponding to FIG. 1, in another optional embodiment of the data interaction method provided in the embodiment of the present invention, the method further includes:

during address exchange, performing the address exchange with the peer client host by using a proxy server.

In the embodiment of the present invention, during address exchange with the peer client host, the proxy server, such as an Extensible Messaging and Presence Protocol (Extensible Messaging and Presence Protocol, XMPP) signaling protocol server may be directly used for the address exchange. An implementation manner may be that Xmpp signaling is sent to the signaling protocol server, or the address exchange is performed by using an extended attribute of the Xmpp signaling.

Figure 2:
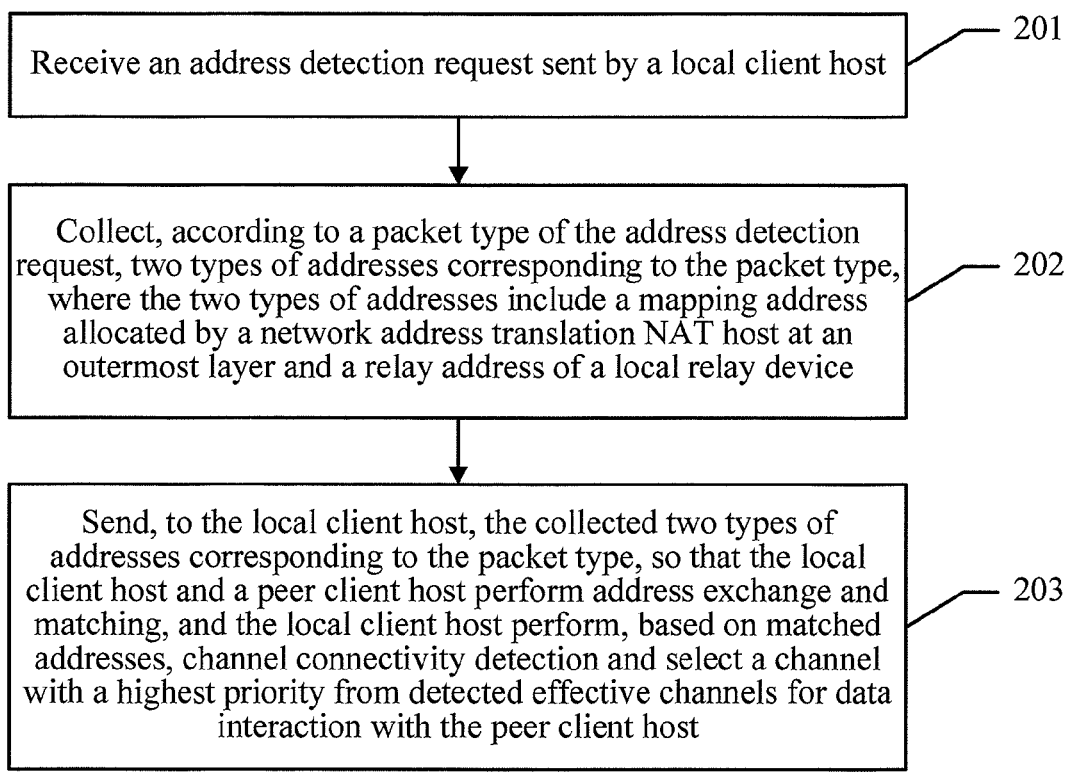
FIG. 2 is a schematic flowchart of another data interaction method according to an embodiment of the present invention.

Referring to FIG. 2, in another embodiment of a data interaction method provided in an embodiment of the present invention, an execution body of the data interaction method may be a relay device. The relay device herein may be, for example, a router, an exchanger, a hub, or a network server. The method according to the embodiment of the present invention may include:

201: Receive an address detection request sent by a local client host.

202: Collect, according to a packet type of the address detection request, two types of addresses corresponding to the packet type, where the two types of addresses include a mapping address allocated by a network address translation NAT host at an outermost layer and a relay address of a local relay device.

203: Send, to the local client host, the collected two types of addresses corresponding to the packet type, so that the local client host and a peer client host perform address exchange and address matching, and the local client host perform, based on matched addresses, channel connectivity detection and select a channel with a highest priority from detected effective channels for data interaction with the peer client host.

Compared with the prior art, in the data interaction method provided in the embodiment of the present invention, when one of an address detection request for a UDP channel and an address detection request for a TCP channel that are sent simultaneously traverses a NAT host successfully, a client host collects two types of addresses of a corresponding channel, which improves efficiency of traversing a NAT host by the client host during address detection, thereby shortening an initiation delay for data interaction between two client hosts.

Optionally, based on the embodiment corresponding to FIG. 2, an optional embodiment of the data interaction method provided in the embodiment of the present invention may further include:

receiving data sent by the local client host, where a destination end address of the data indicates that a receiver of the data is the peer client host;

converting the data to data in a UDP format; and sending the data in the UDP format to a peer relay device through a UDP channel between the local relay device and the peer relay device.

In the embodiment of the present invention, the channel between the local relay device and the peer relay device is a fixed UDP channel, and therefore, when a format of data received by a relay device is a non-UDP format, format conversion is performed on the data, and the data is converted to data in a UDP format, for transmission between the two relay devices.

Optionally, based on the embodiment corresponding to FIG. 2, another optional embodiment of the data interaction method provided in the embodiment of the present invention may further include:

receiving data in a UDP format sent by a peer relay device;

determining a channel with a highest priority between the local relay device and the local client host;

when the channel with the highest priority between the local relay device and the local client host is a non-UDP channel, converting the data from the UDP format to a format corresponding to the channel with the highest priority; and sending data in a converted format to the local client host.

In the embodiment of the present invention, the data received by the relay device and sent by a peer relay device is data in a UDP format; a channel with a highest priority between a local relay device and a local client host is first determined; format conversion needs to be performed on the data after it is determined that the channel with the highest priority is not a UDP channel; when the channel with the highest priority is a TCP channel, the data format is converted to a TCP format; if the channel with the highest priority is an HTTP channel, the data format is converted to an HTTP format; and then, the converted data is sent to the local client host through a corresponding channel.

Figure 3:
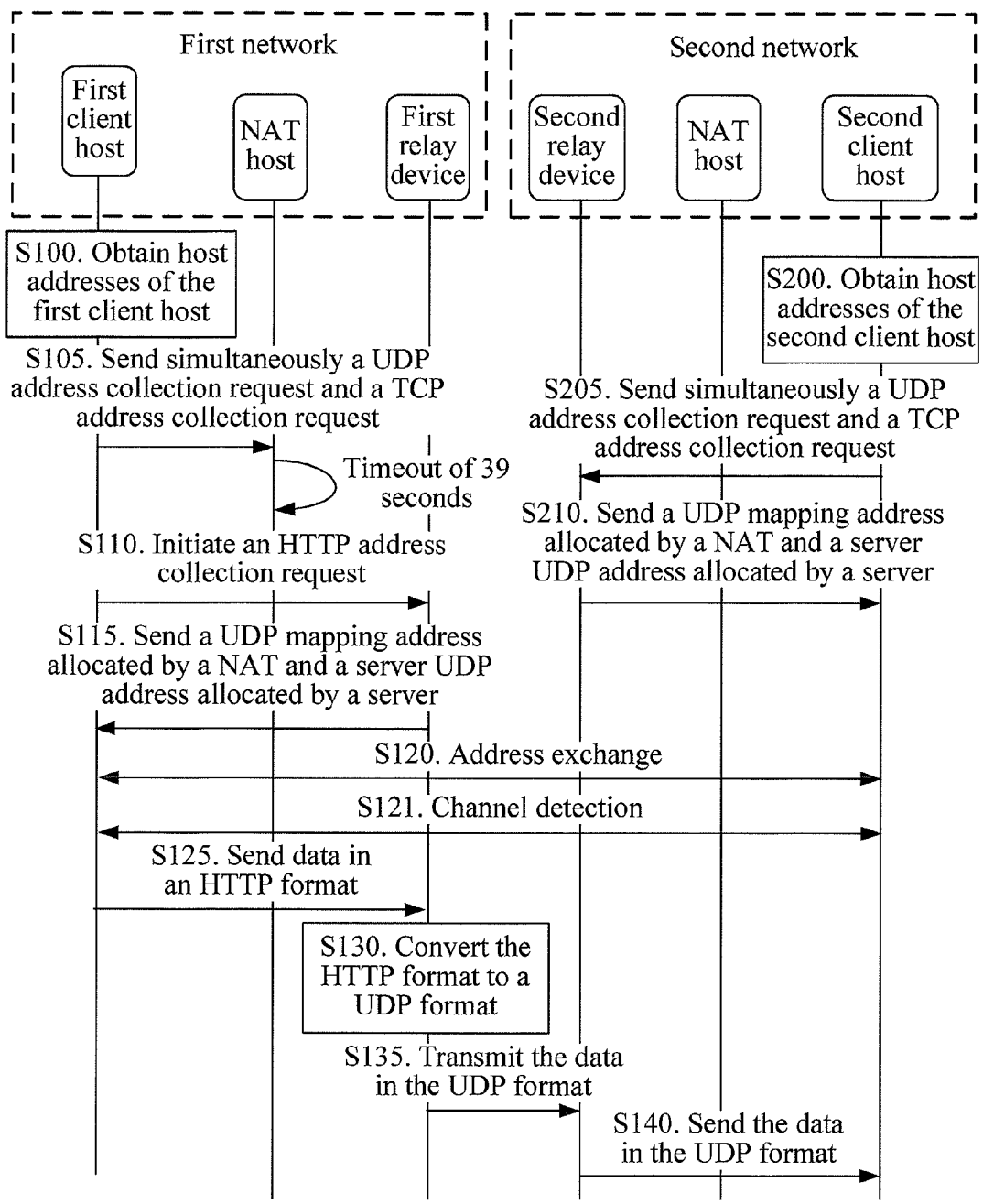
FIG. 3 is a schematic sequence diagram of a data interaction method in an application scenario according to an embodiment of the present invention.

For ease of understanding, several application scenarios are used as examples in the following to describe in detail a data interaction process in the embodiment of the present invention:

Referring to FIG. 3, there are two networks, namely, a first network and a second network. A first client host in the first network and a second client host in the second network need to perform data interaction.

S100: The first client host in the first network obtains a host address of a User Datagram Protocol UDP channel of the first client host, a host address of a Transmission Control Protocol TCP channel of the first client host, and a host address of a Hypertext Transfer Protocol HTTP channel of the first client host.

S105: The first client host in the first network sends simultaneously a UDP address detection request and a TCP address detection request to a first relay device in the first network.

If no response is received after 39 seconds, it is determined that both the UDP address detection request and the TCP address detection request fail. Step S110 is executed, so as to send an HTTP address detection request to the first relay device in the first network.

S110: The first client host in the first network sends the HTTP address detection request to the first relay device in the first network.

S115: The first relay device in the first network returns, through the HTTP channel, a mapping address allocated by a NAT host at an outermost layer of a network side where the first client host is located, and a relay address of the first relay device providing a relay service for the first client host.

S200: The second client host in the second network obtains a host address of the User Datagram Protocol UDP channel of the second client host, a host address of the Transmission Control Protocol TCP channel of the second client host, and a host address of the Hypertext Transfer Protocol HTTP channel of the second client host.

S205: The second client host in the second network sends simultaneously a UDP address detection request and a TCP address detection request to a second relay device in the second network.

S210: The second relay device in the second network returns, through the UDP channel, an address of a NAT host of a network side where the second client host is located and an address of the second relay device of the second network where the second client host is located.

S120: The first client host of the first network and the second client host of the second network perform address exchange.

S121: The first client host of the first network and the second client host of the second network separately perform connectivity detection by address matching, so as to determine a data transmission channel with a highest priority.

S125: The first client host of the first network sends data to the first relay device of the first network through the HTTP channel.

S130: The first relay device of the first network converts the data in an HTTP format to data in a UDP format.

S135: The first relay device of the first network sends the converted data in the UDP format to the second relay device of the second network.

S140: The second relay device of the second network sends the data in the UDP format to the second client host of the second network through the UDP channel.

Conversely, the second client host of the second network sends the data in the UDP format to the second relay device of the second network through the UDP channel, and the second relay device of the second network sends the data in the UDP format to the first relay device of the first network; the first relay device of the first network converts the data in the UDP format to data in the HTTP format after receiving the data in the UDP format, and then the first relay device of the first network sends the data in the HTTP format to the first client host of the first network through the HTTP channel.

In the data interaction scenario provided in the embodiment of the present invention, a client host performs address detection in a manner of sending simultaneously an address detection request for a User Datagram Protocol UDP channel and an address detection request for a Transmission Control Protocol TCP channel, which improves efficiency of traversing a NAT host during address detection, thereby shortening an initiation delay of data interaction between two client hosts.

Figure 4:
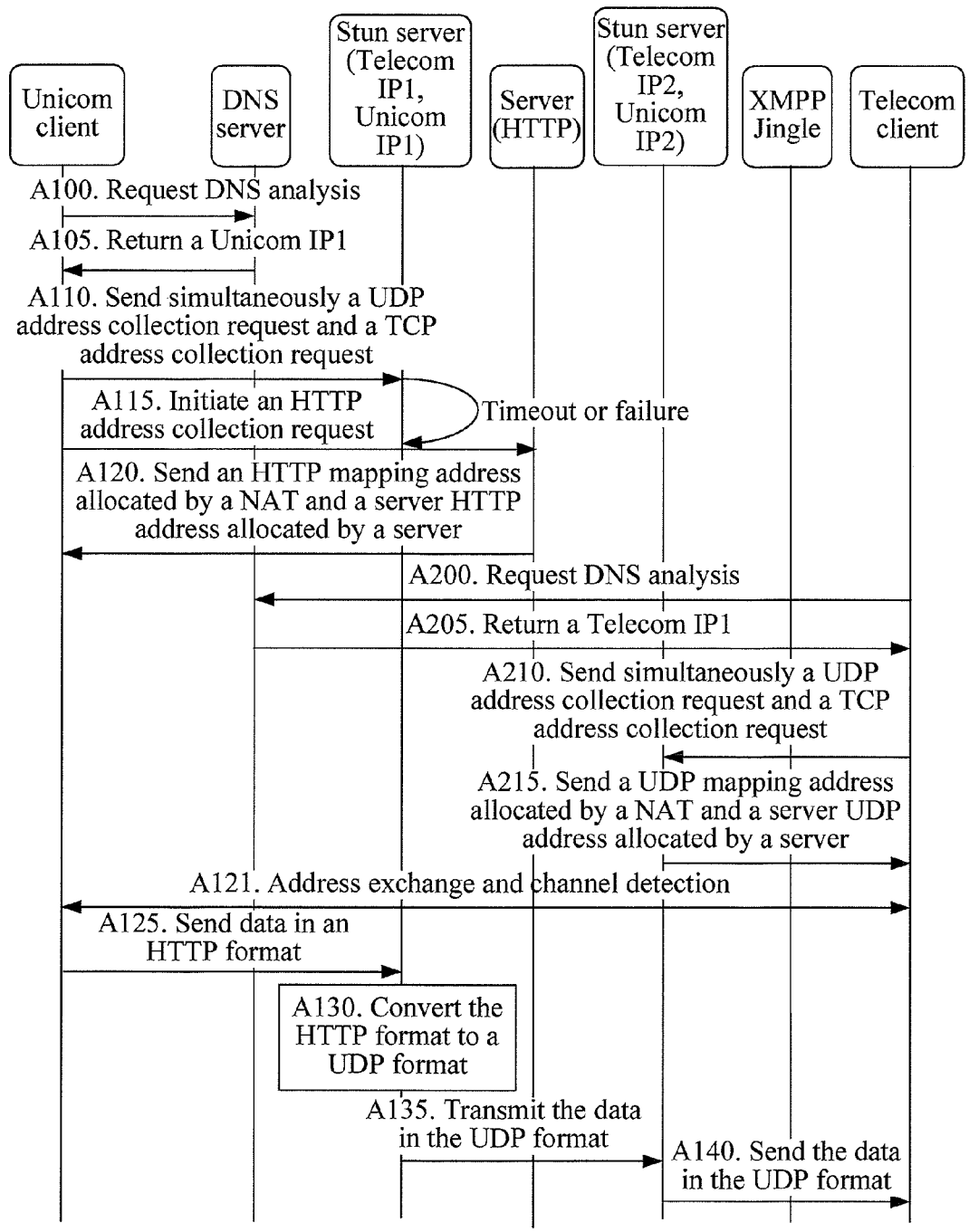
FIG. 4 is a schematic sequence diagram of a data interaction method in another application scenario according to an embodiment of the present invention.

Referring to FIG. 4, FIG. 4 shows a scenario where a Unicom subscriber and a Telecom subscriber communicate by telephone, and a specific description is provided in the following:

A100: A Unicom client requests DNS resolution from a Domain Name System (Domain Name System, DNS) relay device.

A105: The DNS relay device returns a Unicorn address IP1.

The Unicom IP1 address serves as a host address of the Unicom client.

A110: The Unicom client sends simultaneously a UDP address detection request and a TCP address detection request to a relay device at a Unicom end.

A115: After timeout or failure, send an HTTP address detection request to an HTTP relay device.

A120: Receive an address of a NAT host at an outermost layer and a relay address through an HTTP channel.

A200: A telecom client requests DNS analysis.

A205: Return a Telecom IP1 address.

The Telecom IP1 address serves as a host address of the Telecom client.

A210: The Telecom client sends simultaneously a UDP address detection request and a TCP address detection request to a relay device at a Telecom end.

A215: The Telecom relay device sends an address of a NAT host and a relay address to the Telecom client through a UDP channel.

A121: The Unicom client and the Telecom client perform address exchange and perform connectivity detection, so as to determine a channel with a highest priority.

A125: The Unicom client sends data in an HTTP format to the Unicom relay device through the HTTP channel.

A130: The Unicom relay device converts the data in the HTTP format to data in a UDP format.

A135: The Unicorn relay device sends the converted data in the UDP format to the Telecom relay device.

A140: The Telecom relay device sends the data in the UDP format to the Telecom client through the UDP channel.

In the data interaction scenario provided in the embodiment of the present invention, a client host performs address detection in a manner of sending simultaneously an address detection request for a User Datagram Protocol UDP channel and an address detection request for a Transmission Control Protocol TCP channel, which improves efficiency of traversing a NAT host during address detection, thereby shortening an initiation delay of data interaction between two client hosts.

Figure 5A:
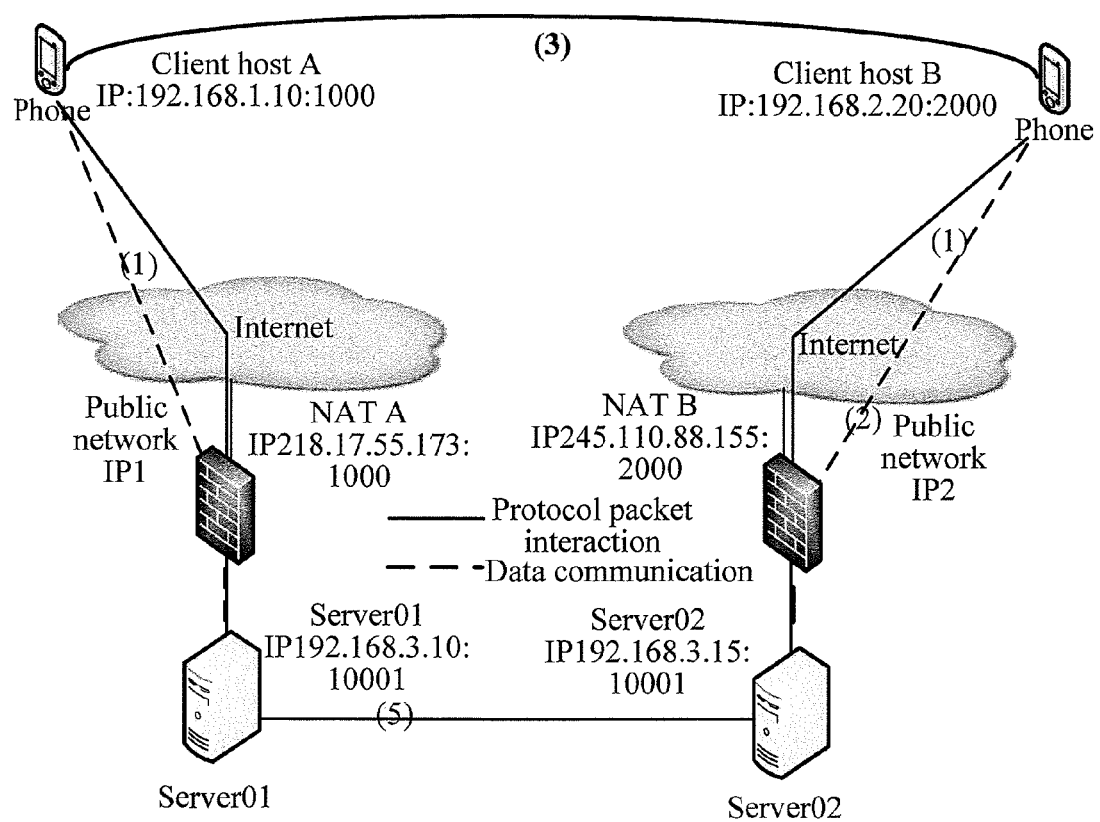
FIG. 5A is a schematic networking diagram of an application scenario according to an embodiment of the present invention.

Referring to FIG. 5A, FIG. 5A shows an example of an application scenario provided in an embodiment of the present invention:

(1) Address collection procedure 1: A client host A obtains a host address hostA (192.168.1.10:1000), and sends simultaneously address detection requests to a server 01 through a UDP channel and a TCP channel first, so as to collect a mapping address of a NAT A; because the NAT A at an outermost layer only allows an HTTP packet to pass through, the address detection requests for the UDP channel and the TCP channel fail; the client host A sends an address detection request for an HTTP channel after the address detection requests for the UDP channel and the TCP channel fail, the NAT A at the outermost layer allocates a mapping address (IP2: 218.17.55.173:1000), and after the address detection request arrives at the server, the server 01 allocates a transit resource (IP3: 192.168.3.10: 10001), and at the same time, the server 01 feeds the NAT A addresses IP2 and IP3 back to the client host A, so as to finish the address collection procedure.

(2) Address collection procedure 2: A client host B obtains a host address hostB (192.168.2.20:2000), and sends simultaneously address detection requests to a server 02 through the UDP channel and the TCP channel; because a NAT host B at an outermost layer does not limit a packet type, the address detection requests for the UDP channel and the TCP channel traverse the NAT host B at the outermost layer and arrive at the server 02; the server 02 allocates a transit resource (IP5:192.168.3.15:10001), and the server 02 feeds back an address (IP4: 245.110.88.155:2000) allocated by the NAT host B and the relay address (IP5: 192.168.3.15: 10001); in this way, the client host B finishes the address collection procedure.

(3) Address exchange: The client host A and the client host B finish address exchange in another manner (for example, xmpp signaling).

For example, the client host A sends the hostA address, the IP2, and the IP3 to the client host B, and at the same time, waits for the client host B to return the hostB, the IP4, and the IP5 of the client host B.

(4) Connectivity detection: The client host A matches the local addresses after the exchange with the addresses sent by the client host B, for example, (an address pair 01: HOSTA->HOSTB, an address pair 02: HOSTA->IP4, and an address pair 03: IP3->IP5); and a matching process of the client host B is the same as that of the client host A; then, the two parties perform channel detection for each pair of addresses; and finally, it is assumed that a relay channel between the server 01 and the server 02 is established.

(5) Data communication: The client host A and the client host B start data communication after a server relay channel is selected, and a process is as follows: The client host A sends data to the server 01 by using an HTTP packet format, the HTTP packet is converted to a UDP packet after the data arrives at the IP3 of the server 01, and then the UDP packet is forwarded to the IP5 of the server 02; and the server 02 forwards the UDP packet to the client host B after receiving the UDP packet. In reverse, a process is the same.

In the data interaction scenario provided in the embodiment of the present invention, a client host performs address detection in a manner of sending simultaneously an address detection request for a User Datagram Protocol UDP channel and an address detection request for a Transmission Control Protocol TCP channel, which improves efficiency of traversing a NAT host during address detection, thereby shortening an initiation delay of data interaction between two client hosts.

Figure 5B:
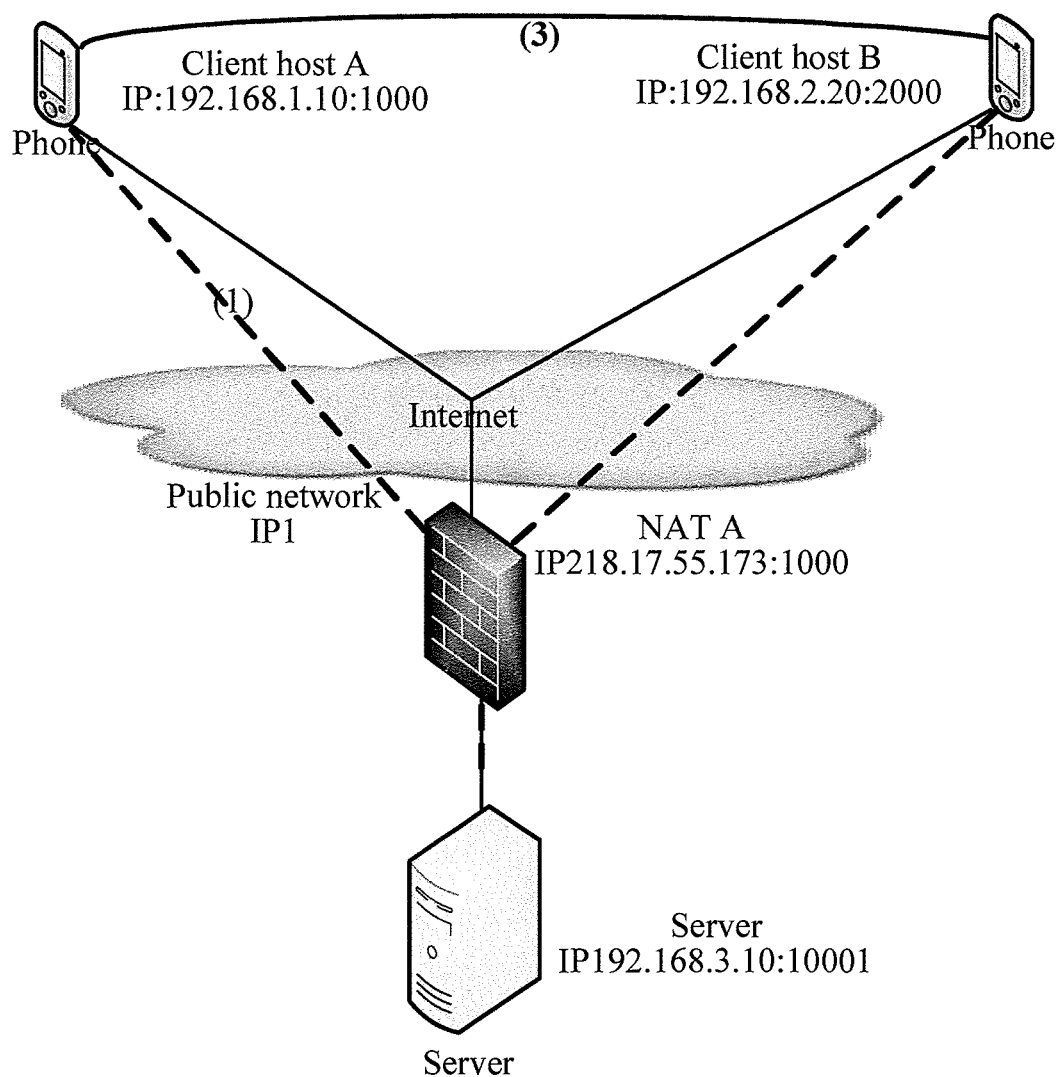
FIG. 5B is a schematic networking diagram of another application scenario according to an embodiment of the present invention.

Referring to FIG. 5B, when a client host A and a client host B are in a same network, the client host A may perform direct communication with the client host B by selecting the UDP channel.

Figure 6:
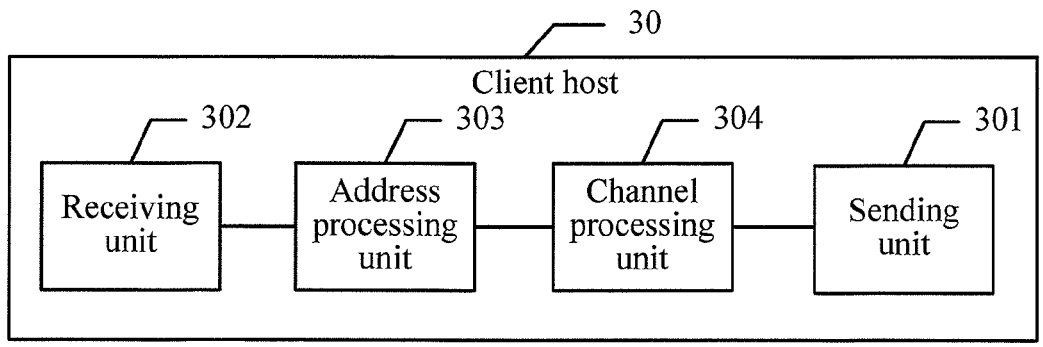
FIG. 6 is a schematic structural diagram of a client host according to an embodiment of the present invention.

Referring to FIG. 6, an embodiment of a client host provided in an embodiment of the present invention includes:

a sending unit 301, configured to send simultaneously an address detection request for a User Datagram Protocol UDP channel and an address detection request for a Transmission Control Protocol TCP channel; and when both address detection for the UDP channel and address detection for the TCP channel fail, send an address detection request for a Hypertext Transfer Protocol HTTP channel;

a receiving unit 302, configured to: when detection of at least one channel succeeds, receive two types of addresses corresponding to each channel in the at least one channel, where the two types of addresses include a mapping address allocated by a network address translation NAT host at an outermost layer and a relay address of a relay device providing a relay service;

an address processing unit 303, configured to perform address exchange and address matching on the addresses received by the receiving unit 302 with a peer client host; and a channel processing unit 304, configured to perform channel connectivity detection based on the addresses matched by the address processing unit 303, and select a channel with a highest priority from detected effective channels for data interaction with the peer client host.

In the embodiment of the present invention, the sending unit 301 sends simultaneously an address detection request for a User Datagram Protocol UDP channel and an address detection request for a Transmission Control Protocol TCP channel; and when both address detection for the UDP channel and address detection for the TCP channel fail, sends an address detection request for a Hypertext Transfer Protocol HTTP channel; when detection of at least one channel succeeds, the receiving unit 302 receives two types of addresses corresponding to each channel in the at least one channel, where the two types of addresses include a mapping address allocated by a network address translation NAT host at an outermost layer and a relay address of a relay device providing a relay service; the address processing unit 303 performs address exchange and address matching on the addresses received by the receiving unit 302 with the peer client host; and the channel processing unit 304 performs channel connectivity detection based on the addresses matched by the address processing unit 303, and selects a channel with a highest priority from detected effective channels for data interaction with the peer client host. Compared with a single-step detection manner in the prior art, the client host provided in the embodiment of the present invention performs address detection in a manner of sending simultaneously the address detection request for the User Datagram Protocol UDP channel and the address detection request for the Transmission Control Protocol TCP channel, which improves efficiency of traversing a NAT host during address detection, thereby shortening an initiation delay of data interaction between two client hosts.

Figure 7:
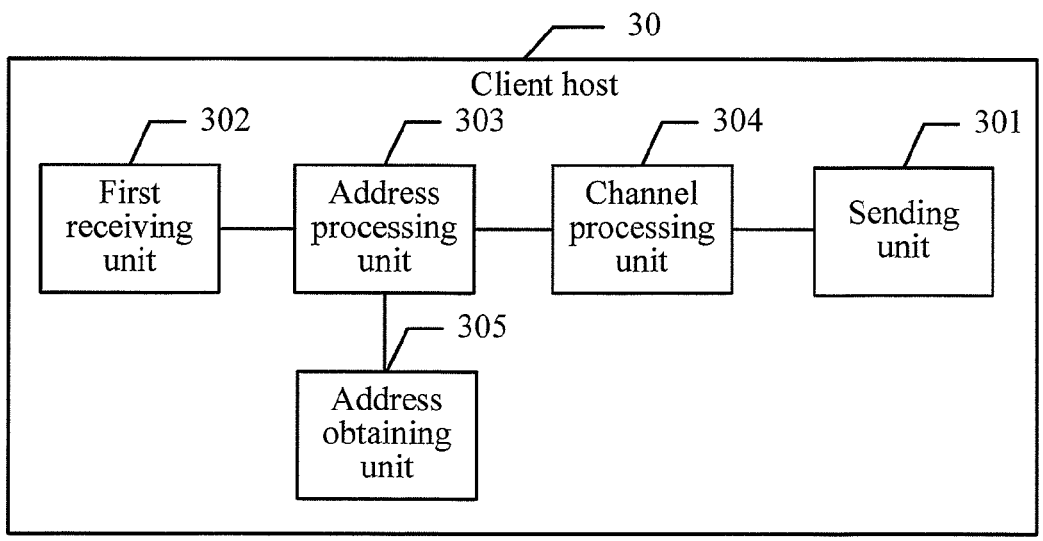
FIG. 7 is a schematic structural diagram of another client host according to an embodiment of the present invention.

Optionally, based on the embodiment corresponding to FIG. 6, referring to FIG. 7, in another embodiment of the client host provided in the embodiment of the present invention, the client host further includes: an address obtaining unit 305.

The address obtaining unit 305 is configured to obtain host addresses of three types of channels of a local client host, where the host addresses of the three types of channels include a host address of a UDP channel, a host address of a TCP channel, and a host address of an HTTP channel.

The address processing unit 303 is configured to exchange and match the host addresses of the three types of channels of the local client host and the collected two types of addresses, with host addresses of the three types of channels of the peer client host and the two types of addresses collected by the peer client host.

Optionally, based on the embodiment corresponding to FIG. 7, in another embodiment of the client host provided in the embodiment of the present invention:

the address processing unit 303 is configured to exchange and match the host address of the UDP channel of the local client host, the host address of the TCP channel of the local client host, the host address of the HTTP channel of the local client host, and the mapping address allocated by the network address translation NAT host at the outermost layer of each channel in the at least one channel and the relay address of the local relay device, where the mapping address and the relay address are collected by the local client host, with a host address of the UDP channel of the peer client host, a host address of the TCP channel of the peer client host, a host address of the HTTP channel of the peer client host, and a mapping address allocated by a NAT host at an outermost layer and a relay address of a peer relay device, where the mapping address and the relay address are collected by the peer client host.

Optionally, based on the optional embodiment corresponding to FIG. 7, in another embodiment of the client host provided in the embodiment of the present invention:

the channel processing unit 304 is configured to detect connectivity of a UDP channel between the host address of the UDP channel of the local client host and the host address of the UDP channel of the peer client host, wherein the host address of the UDP channel of the local client host and the host address of the UDP channel of the peer client host are matched; and when the UDP channel is connected successfully, select the UDP channel as a channel that has a highest priority when the local client host and the peer client host perform data interaction.

Optionally, based on the foregoing embodiments, in another embodiment of the client host provided in the embodiment of the present invention:

the address processing unit 303 is further configured to: during address exchange, perform the address exchange with the peer client host by using a proxy server.

Figure 8:
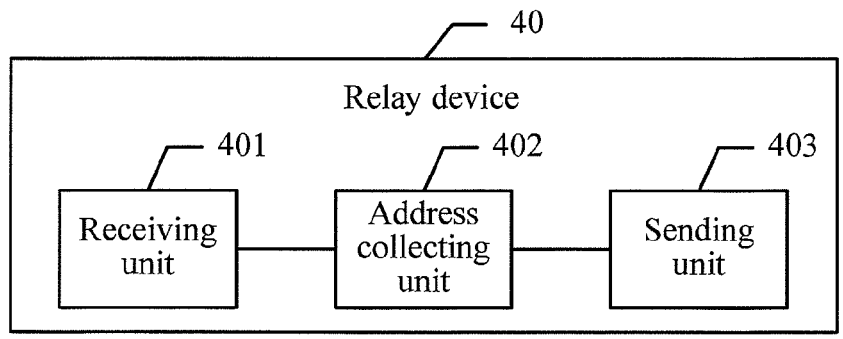
FIG. 8 is a schematic structural diagram of a relay device according to an embodiment of the present invention.

Referring to FIG. 8, an embodiment of a relay device provided in an embodiment of the present invention includes:

a receiving unit 401, configured to receive an address detection request sent by a local client host; where for example, in FIG. 5A, for the server 01, the local client host is the client host A, and for the server 02, the local client host is the client host B; in FIG. 5B, both the client host A and the client host B are the local client host for the server; and an address collecting unit 402, configured to collect, according to a packet type of the address detection request received by the receiving unit 401, two types of addresses corresponding to the packet type, where the two types of addresses include a mapping address allocated by a network address translation NAT host at an outermost layer and a relay address of a local relay device; and a sending unit 403, configured to send, to the local client host, the two types of addresses which correspond to the packet type and are collected by the address collecting unit 402, so that the local client host and a peer client host perform address exchange and address matching, and the local client host perform, based on matched addresses, channel connectivity detection and select a channel with a highest priority from detected effective channels for data interaction with the peer client host.

In the embodiment of the present invention, the receiving unit 401 receives an address detection request sent by a local client host; the address collecting unit 402 collects, according to a packet type of the address detection request received by the receiving unit 401, two types of addresses corresponding to the packet type, where the two types of addresses include a mapping address allocated by a network address translation NAT host at an outermost layer and a relay address of a local relay device; and the sending unit 403 sends, to the local client host, the two types of addresses which correspond to the packet type and are collected by the address collecting unit 402, so that the local client host and a peer client host perform address exchange and address matching, and the local client host perform, based on matched addresses, channel connectivity detection and select a channel with a highest priority from detected effective channels for data interaction with the peer client host. Compared with the prior art, by using the relay device provided in the embodiment of the present invention, a client host can collect two types of addresses of a corresponding channel when one of an address detection request for a UDP channel and an address detection request for a TCP channel that are sent simultaneously traverses a NAT host successfully, which improves efficiency of traversing a NAT host by the client host during address detection, thereby shortening an initiation delay for data interaction between two client hosts.

Figure 9:
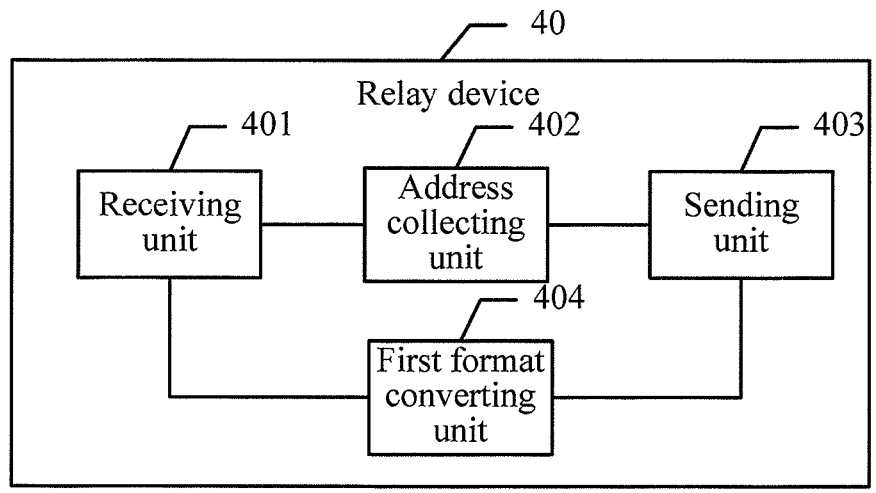
FIG. 9 is a schematic structural diagram of another relay device according to an embodiment of the present invention.

Based on the embodiment corresponding to FIG. 8, referring to FIG. 9, the relay device provided in the embodiment of the present invention further includes: a first format converting unit 404.

The receiving unit 401 is further configured to receive data sent by the local client host, where a destination end address of the data indicates that a receiver of the data is the peer client host.

The first format converting unit 404 is configured to convert the data received by the receiving unit 401 to data in a UDP format.

The sending unit 403 is configured to send the data in the UDP format to a peer relay device through a UDP channel between the local relay device and the peer relay device.

Figure 10:
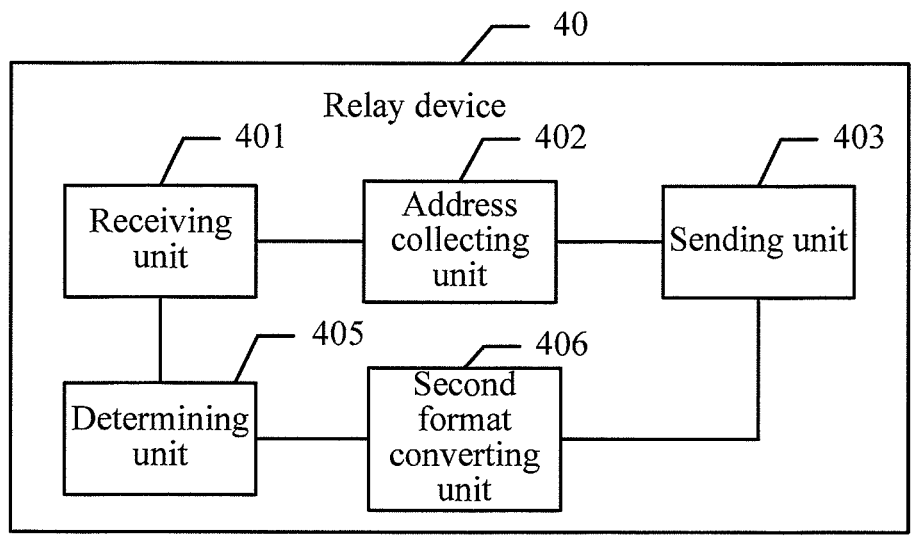
FIG. 10 is a schematic structural diagram of still another relay device according to an embodiment of the present invention.

Based on the embodiment corresponding to FIG. 8, referring to FIG. 10, the relay device provided in the embodiment of the present invention further includes: a determining unit 405 an a second format converting unit 406.

The receiving unit 401 is further configured to receive the data in the UDP format sent by the peer relay device.

The determining unit 405 is configured to determine a channel with a highest priority between the local relay device and the local client host.

The second format converting unit 406 is configured to: when the determining unit 405 determines that the channel with the highest priority between the local relay device and the local client host is a non-UDP channel, convert the data from the UDP format to a format corresponding to the channel with the highest priority.

The sending unit 403 is configured to send, to the local client host, the data whose format is converted by the second format converting unit.

An embodiment of the present invention further provides a computer readable storage medium, where the medium stores a program, and when the program is run, a part or all of the steps of the data interaction method at the client host side are performed.

An embodiment of the present invention further provides a computer readable storage medium, where the medium stores a program, and when the program is run, a part or all of the steps of the data interaction method at the relay device side are performed.

Figure 11:
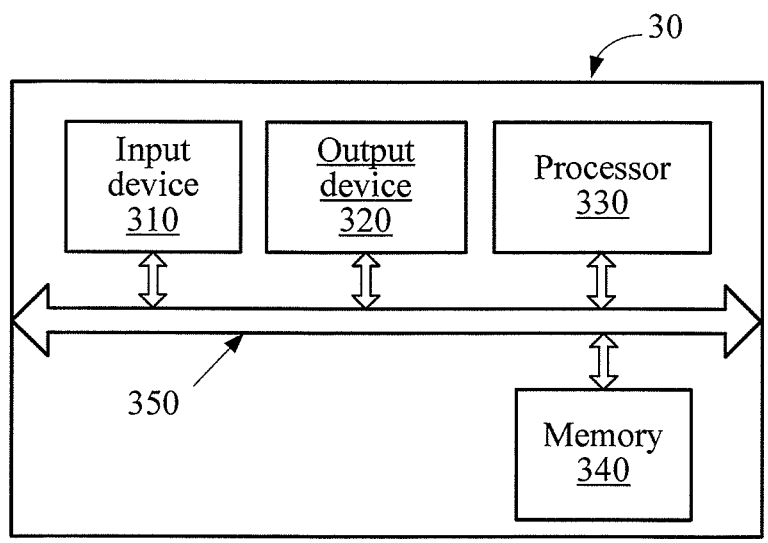
FIG. 11 is a schematic structural diagram of another client host according to an embodiment of the present invention.

FIG. 11 is a schematic structural diagram of a client host 30 according to an embodiment of the present invention. The client host 30 may include an input device 310, an output device 320, a processor 330, and a memory 340.

The memory 340 may include a read only memory and a random access memory, and provides an instruction and data for the processor 330. A part of the memory 340 may further include a non-volatile random access memory (NVRAM).

The memory 340 stores the following elements, and may execute a module or a data structure, or a subset of the module and the data structure, or an extended set of the module and the data structure:

an operating instruction: including various operating instructions and used to implement various operations; and an operating system: including various system programs and used to implement various basic services and process a hardware-based task.

In the embodiment of the present invention, the processor 330 executes the following operations by invoking the operating instruction (the operating instruction may be stored in the operating system) stored by the memory 340:

sending, by using the output device 320, simultaneously an address detection request for a User Datagram Protocol UDP channel and an address detection request for a Transmission Control Protocol TCP channel; when both address detection for the UDP channel and address detection for the TCP channel fail, sending, by using the output device 320, an address detection request for a Hypertext Transfer Protocol HTTP channel; when detection of at least one channel succeeds, collecting, by using the input device 310, two types of addresses corresponding to each channel in the at least one channel, where the two types of addresses include a mapping address allocated by a network address translation NAT host at an outermost layer of each channel and a relay address of a local relay device; performing address exchange and address matching with a peer client host; and performing channel connectivity detection based on matched addresses, and selecting a channel with a highest priority from detected effective channels for data interaction with the peer client host.

In the embodiment of the present invention, a client host performs address detection in a manner of sending simultaneously an address detection request for a User Datagram Protocol UDP channel and an address detection request for a Transmission Control Protocol TCP channel, which improves efficiency of traversing a NAT host during address detection, thereby shortening an initiation delay of data interaction between two client hosts.

The processor 330 controls an operation of the client host 30, and the processor 330 may also be referred to as a CPU (Central Processing Unit, central processing unit). The memory 340 may include a read only memory and a random access memory, and provides an instruction and data for the processor 330. A part of the memory 340 may further include a non-volatile random access memory (NVRAM). In a specific application, all components of the client host 30 are coupled by using a bus system 350, and in addition to a data bus, the bus system 350 may further include a power bus, a control bus, a state signal bus, and the like. However, for ease of clear description, all types of buses in the diagram are marked as the bus system 350.

The methods disclosed in the foregoing embodiments of the present invention may be applied to the processor 330, or may be implemented by the processor 330. The processor 330 may be an integrated circuit chip and has a signal processing capability. In an implementation process, the steps in the foregoing methods may be implemented by means of an integrated logic circuit of hardware in the processor 330, or an instruction in a form of software. The processor 330 may be a general processor, a digital signal processor (DSP), an application-specific integrated circuit (ASIC), a field-programmable gate array (FPGA) or another programmable logic component, a discrete gate or a transistor logic device, or a discrete hardware component. The processor 330 may implement or execute all methods, steps, and logic diagrams disclosed in the embodiments of the present invention. The general processor may be a microprocessor, or the general processor may also be any conventional processor, or the like. The steps in the methods disclosed in the embodiments of the present invention may be directly implemented by a hardware decoding processor, or may be implemented by combining hardware and software modules in a decoding processor. The software module may be located in a mature storage medium in the field, such as a random access memory, a flash memory, a read only memory, a programmable read only memory or an electrically erasable programmable memory, or a register. The storage medium is located in the memory 340, and the processor 330 reads information in the memory 340 and implements steps in the foregoing method in combination with the memory 340.

Optionally, the processor 330 may further obtain host addresses of three types of addresses of a local client host, where the host addresses of the three types of addresses include a host address of a UDP channel, a host address of a TCP channel, and a host address of an HTTP channel; and exchange and match the host addresses of the three types of channels of the local client host and the collected two types of addresses, with host addresses of the three types of addresses of a peer client host and the two types of addresses collected by the peer client host.

Optionally, the processor 330 may further exchange and match the host address of the UDP channel of the local client host, the host address of the TCP channel of the local client host, the host address of the HTTP channel of the local client host, and the mapping address allocated by the network address translation NAT host at the outermost layer of each channel in the at least one channel and a relay address of a local relay device, where the mapping address and the relay address are collected by the local client host, with a host address of the UDP channel of the peer client host, a host address of the TCP channel of the peer client host, a host address of the HTTP channel of the peer client host, and a mapping address allocated by a NAT host at an outermost layer and a relay address of a peer relay device, where the mapping address and the relay address are collected by the peer client host.

Optionally, the processor 330 may specifically detect connectivity of a UDP channel between the host address of the UDP channel of the local client host and the host address of the UDP channel of the peer client host, wherein the host address of the UDP channel of the local client host and the host address of the UDP channel of the peer client host are matched; and when the UDP channel is connected successfully, select the UDP channel as a channel that has a highest priority when the local client host and the peer client host perform data interaction.

Optionally, the processor 330 may further perform, during address exchange, the address exchange with the peer client host by using a signaling protocol server.

Figure 12:
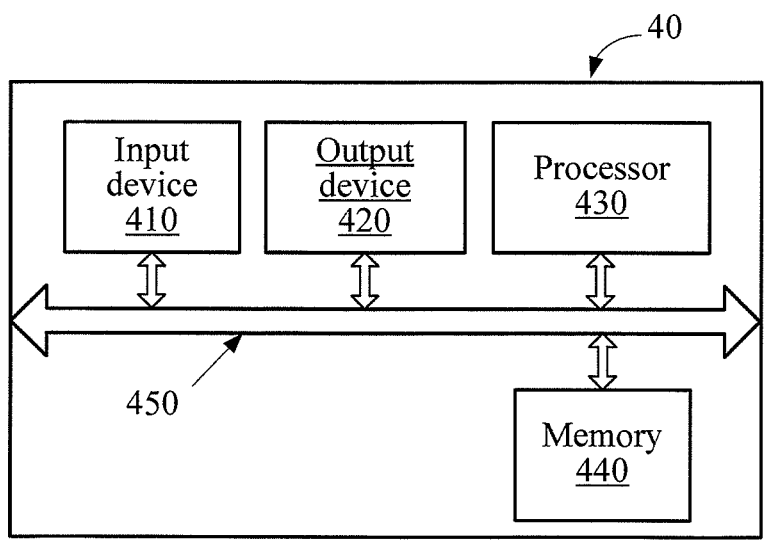
FIG. 12 is a schematic structural diagram of still another relay device according to an embodiment of the present invention.

FIG. 12 is a schematic structural diagram of a relay device 40 according to an embodiment of the present invention. The relay device 40 may include an input device 410, an output device 420, a processor 430, and a memory 440.

The memory 440 may include a read only memory and a random access memory, and provides an instruction and data for the processor 430. A part of the memory 440 may further include a non-volatile random access memory (NVRAM).

The memory 440 stores the following elements, and may execute a module or a data structure, or a subset of the module or the data structure, or an extended set of the module or the data structure:

an operating instruction: including various operating instructions and used to implement various operations; and an operating system: including various system programs and used to implement various basic services and process a hardware-based task.

In the embodiment of the present invention, the processor 430 executes the following operations by invoking the operating instruction (the operating instruction may be stored in the operating system) stored by the memory 440:

receiving, by using the input device 410, an address detection request sent by a local client host; collecting, according to a packet type of the address detection request, two types of addresses corresponding to the packet type, where the two types of addresses include a mapping address allocated by a network address translation NAT host at an outermost layer and a relay address of a local relay device; and sending, to the local client host by using the output device 420, the collected two types of addresses corresponding to the packet type, so that the local client host and a peer client host perform address exchange and address matching, and the local client host perform, based on matched addresses, channel connectivity detection and select a channel with a highest priority from detected effective channels for data interaction with the peer client host.

By using the relay device provided in the embodiment of the present invention, a client host can collect two types of addresses of a corresponding channel when one of an address detection request for a UDP channel and an address detection request for a TCP channel that are sent simultaneously traverses a NAT host successfully, which improves efficiency of traversing a NAT host by the client host during address detection, thereby shortening an initiation delay for data interaction between two client hosts.

The processor 430 controls an operation of the relay device 40, and the processor 430 may also be referred to as a CPU (Central Processing Unit, central processing unit). The memory 440 may include a read only memory and a random access memory, and provides an instruction and data for the processor 430. A part of the memory 440 may further include a non-volatile random access memory (NVRAM). In a specific application, all components of the relay device 40 are coupled by using a bus system 450, and in addition to a data bus, the bus system 450 may further include a power bus, a control bus, a state signal bus, and the like. However, for ease of clear description, all types of buses in the diagram are marked as the bus system 450.

The method disclosed in the foregoing embodiments of the present invention may be applied to the processor 430, or may be implemented by the processor 430. The processor 430 may be an integrated circuit chip and has a signal processing capability. In an implementation process, the steps in the foregoing method may be implemented by means of an integrated logic circuit of hardware in the processor 430, or an instruction in a form of software. The processor 430 may be a general processor, a digital signal processor (DSP), an application-specific integrated circuit (ASIC), a field-programmable gate array (FPGA) or another programmable logic component, a discrete gate or a transistor logic device, or a discrete hardware component. The processor 430 may implement or execute all methods, steps, and logic diagrams disclosed in the embodiments of the present invention. The general processor may be a microprocessor, or the general processor may also be any conventional processor, or the like. The steps in the method disclosed in the embodiments of the present invention may be directly implemented by a hardware decoding processor, or may be implemented by combining hardware and software modules in a decoding processor. The software module may be located in a mature storage medium in the field, such as a random access memory, a flash memory, a read only memory, a programmable read only memory or an electrically erasable programmable memory, or a register. The storage medium is located in the memory 440, and the processor 430 reads information in the memory 440 and implements the steps in the foregoing method in combination with the memory 440.

Optionally, the input device 410 receives data sent by the local client host, where a destination end address of the data indicates that a receiver of the data is the peer client host; the processor 430 converts the data to data in a UDP format; and the output device 420 sends the data in the UDP format to a peer relay device through a UDP channel between the local relay device and the peer relay device.

Optionally, the input device 410 receives the data in the UDP format sent by the peer relay device; the processor 430 determines a channel with a highest priority between the local relay device and the local client host; and when the channel with the highest priority between the local relay device and the local client host is a non-UDP channel, converts the data from the UDP format to a format corresponding to the channel with the highest priority; and the output device 420 sends data in the converted format to the local client host.

Figure 13:
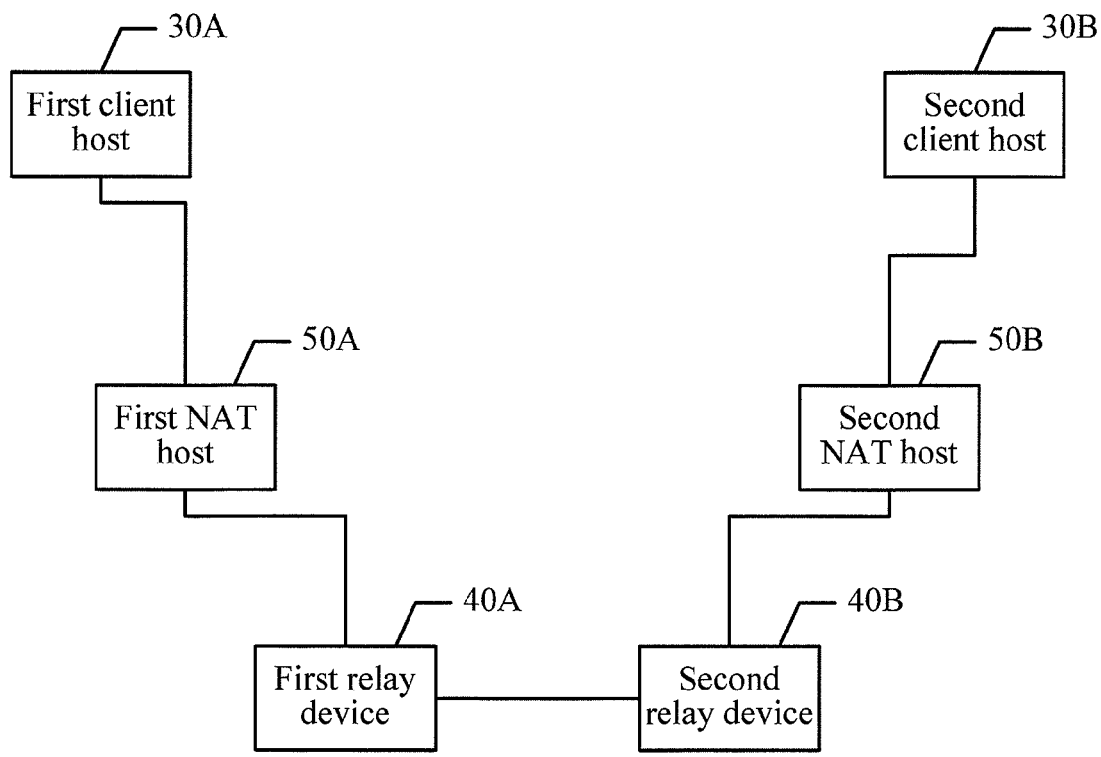
FIG. 13 is a schematic structural diagram of a data interaction system according to an embodiment of the present invention.

Referring to FIG. 13, an embodiment of a data interaction system provided in an embodiment of the present invention includes: a first client host 30A, a second client host 30B, a first NAT host 50A, a second NAT host 50B, a first relay device 40A, and a second relay device 40B.

The first client host 30A, the first NAT host 50A, and the first relay device 40A belong to a first network.

The second client host 30B, the second NAT host 50B, and the second relay device 40B belong to a second network.

The first NAT host 50A is a NAT host at an outermost layer in the first network, and allocates a mapping address to the first client host 30A when receiving an address detection request sent by the first client host 30A.

The second NAT host 50B is a NAT host at an outermost layer in the second network, and allocates a mapping address to the second client host 30B when receiving an address detection request sent by the second client host 30B.

The first client host 30A is configured to send simultaneously an address detection request for a User Datagram Protocol UDP channel and an address detection request for a Transmission Control Protocol TCP channel; and when both address detection for the UDP channel and address detection for the TCP channel fail, send an address detection request for a Hypertext Transfer Protocol HTTP channel; when detection of at least one channel succeeds, collect two types of addresses corresponding to each channel in the at least one channel, where the two types of addresses include a mapping address allocated by a network address translation NAT host at an outermost layer of each channel and a relay address of the local relay device.

The second client host 30B is configured to send simultaneously an address detection request for the User Datagram Protocol UDP channel and an address detection request for the Transmission Control Protocol TCP channel; and when both address detection for the UDP channel and address detection for the TCP channel fail, send an address detection request for the Hypertext Transfer Protocol HTTP channel; when detection of at least one channel succeeds, collect two types of addresses corresponding to each channel in the at least one channel, where the two types of addresses include a mapping address allocated by a network address translation NAT host at an outermost layer of each channel and a relay address of the local relay device.

The first client host 30A and the second client host 30B perform address exchange and address matching.

The first client host 30A and the second client host 30B perform channel connectivity detection separately based on matched addresses, and select a channel with a highest priority from detected effective channels for data interaction with a peer client host.

In the data interaction system provided in the embodiment of the present invention, a client host performs address detection in a manner of sending simultaneously an address detection request for a User Datagram Protocol UDP channel and an address detection request for a Transmission Control Protocol TCP channel, which improves efficiency of traversing a NAT host during address detection, thereby shortening an initiation delay of data interaction between two client hosts.

Figure 14:
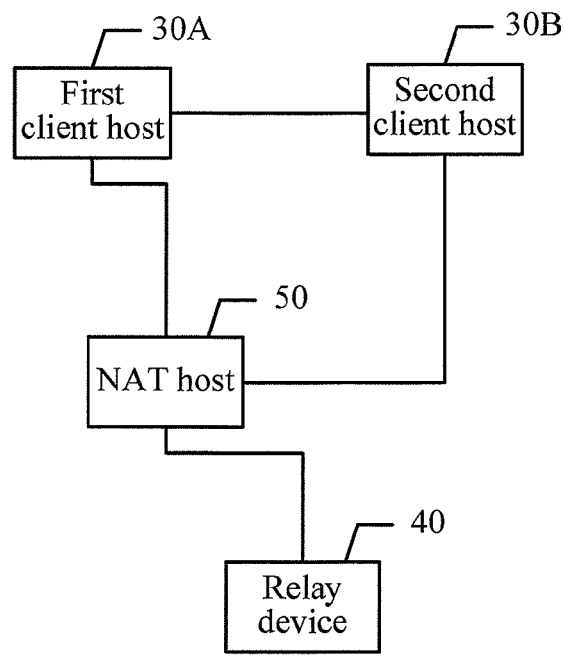
FIG. 14 is a schematic structural diagram of another data interaction system according to an embodiment of the present invention.

Referring to FIG. 14, an embodiment of a data interaction system provided in an embodiment of the present invention includes: a first client host 30A, a second client host 30B, a NAT host 50, and a relay device 40, where the first client host 30A and the second client host 30B belong to a same network.

The NAT host 50 is a NAT host at an outermost layer of the network where the first client host 30A and the second client host 30B are located, and allocates a mapping address to at least one of the first client host and the second client host when receiving an address detection request sent by at least one of the first client host 30A and the second client host 30B.

The first client host 30A is configured to send simultaneously an address detection request for a User Datagram Protocol UDP channel and an address detection request for a Transmission Control Protocol TCP channel; and when both address detection for the UDP channel and address detection for the TCP channel fail, send an address detection request for a Hypertext Transfer Protocol HTTP channel; when detection of at least one channel succeeds, collect two types of addresses corresponding to each channel in the at least one channel, where the two types of addresses include a mapping address allocated by a network address translation NAT host at an outermost layer of each channel and a relay address of the local relay device.

The second client host 30B is configured to send simultaneously an address detection request for the User Datagram Protocol UDP channel and an address detection request for the Transmission Control Protocol TCP channel; and when both address detection for the UDP channel and address detection for the TCP channel fail, send an address detection request for the Hypertext Transfer Protocol HTTP channel; when detection of at least one channel succeeds, collect two types of addresses corresponding to each channel in the at least one channel, where the two types of addresses include a mapping address allocated by a network address translation NAT host at an outermost layer of each channel and a relay address of the local relay device.

The first client host 30A and the second client host 30B perform address exchange and address matching.

The first client host 30A and the second client host 30B perform channel connectivity detection separately based on matched addresses, and select a channel with a highest priority from detected effective channels for data interaction with a peer client host.

In the data interaction system provided in the embodiment of the present invention, a client host performs address detection in a manner of sending simultaneously an address detection request for a User Datagram Protocol UDP channel and an address detection request for a Transmission Control Protocol TCP channel, which improves efficiency of traversing a NAT host during address detection, thereby shortening an initiation delay of data interaction between two client hosts.

A person of ordinary skill in the art may understand that all or a part of the steps of the methods in the embodiments may be implemented by a program instructing relevant hardware (such as a processor). The program may be stored in a computer readable storage medium. The storage medium may include: a ROM, a RAM, a magnetic disk, or an optical disc.

The data interaction method, apparatus, and system provided in the embodiments of the present invention are described in detail in the foregoing. The principle and implementation manners of the present invention are described herein through specific examples. The description about the foregoing embodiments is merely provided for ease of understanding of the method and core ideas of the present invention. Meanwhile, a person of ordinary skill in the art can make variations to the specific implementation manners and application scopes according to the ideas of the present invention. Therefore, the content of the specification shall not be construed as a limit to the present invention.

What is claimed is:

1. A data interaction method, comprising:
sending simultaneously, by a client host, an address detection request for a User Datagram Protocol (UDP) channel and an address detection request for a Transmission Control Protocol (TCP) channel; and when both address detection for the UDP channel and address detection for the TCP channel fail, sending an address detection request for a Hypertext Transfer Protocol (HTTP) channel;
when address detection for at least one channel succeeds, collecting, by the client host, two types of addresses corresponding to each channel in the at least one channel, wherein the two types of addresses comprise a mapping address allocated by a network address translation (NAT) host at an outermost layer of each channel and a relay address of a local relay device;
obtaining, by the client host, host addresses of three types of channels of the client host which serves as a local client host, wherein the host addresses of the three types of channels comprise a host address of the UDP channel, a host address of the TCP channel, and a host address of the HTTP channel; and
performing, by the client host, address exchange and address matching with a peer client host, comprising:
exchanging, by the client host, the host addresses of the three types of channels of the client host which serves as the local client host and the two types of addresses collected by the client host which serves as the local client host, with host addresses of the three types of channels of the peer client host and the two types of addresses collected by the peer client host, and
matching, by the client host, the host addresses of the three types of channels of the client host which serves as the local client host and the two types of addresses collected by the client host which serves as the local client host, with host addresses of the three types of channels of the peer client host and the two types of addresses collected by the peer client host; and
performing, by the client host, channel connectivity detection based on matched addresses, and selecting, by the client host, a channel with a highest priority from channels on which connectivity detection is successful for data interaction with the peer client host.

2. The method according to claim 1, wherein exchanging the host addresses of the three types of channels and matching the host addresses of the three types of channels, comprises:
exchanging, by the client host, the host address of the UDP channel of the client host which serves as the local client host, the host address of the TCP channel of the client host which serves as the local client host, the host address of the HTTP channel of the local client host, the mapping address that is collected by the local client host and that is allocated by the NAT host at the outermost layer of each channel in the at least one channel, and the relay address that is of the local relay device and that is collected by the local client host, with a host address of the UDP channel of the peer client host, a host address of the TCP channel of the peer client host, a host address of the HTTP channel of the peer client host, a mapping address that is collected by the peer client host, a mapping address that is collected by the peer client host and that is allocated by a NAT host at an outermost layer, and a relay address that is of a peer relay device and that is collected by the peer client host; and
matching, by the client host, the host address of the UDP channel of the local client host, the host address of the TCP channel of the local client host, the host address of the HTTP channel of the local client host, the mapping address that is collected by the local client host and that is allocated by the NAT host at the outermost layer of each channel in the at least one channel, and the relay address that is of the local relay device and that is collected by the local client host, with a host address of the UDP channel of the peer client host, a host address of the TCP channel of the peer client host, a host address of the HTTP channel of the peer client host, a mapping address that is collected by the peer client host and that is allocated by a NAT host at an outermost layer, and a relay address that is of a peer relay device and that is collected by the peer client host.

3. The method according to claim 2, wherein performing, by the client host, channel connectivity detection based on matched addresses, and selecting a channel with a highest priority from channels on which connectivity detection is successful for data interaction with the peer client host comprises:
detecting, by the client host, connectivity of a UDP channel between the host address of the UDP channel of the local client host and the host address of the UDP channel of the peer client host, wherein the host address of the UDP channel of the local client host and the host address of the UDP channel of the peer client host are matched; and
when the UDP channel is connected successfully, selecting, by the client host, the UDP channel as the channel that has the highest priority when the local client host and the peer client host perform data interaction.

4. A data interaction method, comprising:
receiving, by a relay device, an address detection request sent by a local client host;
collecting, by the relay device, according to a packet type of the address detection request, two types of addresses corresponding to the packet type, wherein the two types of addresses comprise a mapping address allocated by a network address translation NAT host at an outermost layer and a relay address of the relay device which serves as a local relay device; and
sending, by the relay device, to the local client host, the collected two types of addresses corresponding to the packet type, so that the local client host and a peer client host perform address exchange and address matching, so that the local client host perform, based on matched addresses, channel connectivity detection and select a channel with a highest priority from channels on which connectivity detection is successful for data interaction with the peer client host;
wherein the method further comprises:
receiving, by the relay device, data in a UDP format sent by a peer relay device;
determining, by the relay device, a channel with a highest priority between the local relay device and the local client host;
when the channel with the highest priority between the local relay device and the local client host is a non-UDP channel, converting, by the relay device, the data from the UDP format to a format corresponding to the channel with the highest priority; and sending, by the relay device, data in a converted format to the local client host.

5. A client host, comprising:
a memory that stores instructions; and
a processor coupled to the memory and configured to execute the instructions to:
send simultaneously an address detection request for a User Datagram Protocol (UDP) channel and an address detection request for a Transmission Control Protocol (TCP) channel,
when both address detection for the UDP channel and address detection for the TCP channel fail, send an address detection request for a Hypertext Transfer Protocol HTTP channel,
when address detection for at least one channel succeeds, collect two types of addresses corresponding to each channel in the at least one channel, wherein the two types of addresses comprise a mapping address allocated by a network address translation NAT host at an outermost layer and a relay address of a local relay device,
perform address exchange and address matching on the collected addresses with a peer client host,
perform channel connectivity detection based on matched addresses, and select a channel with a highest priority from channels on which connectivity detection is successful for data interaction with the peer client host,
obtain host addresses of three types of channels of the client host which serves as a local client host, wherein the host addresses of the three types of channels comprise a host address of the UDP channel, a host address of the TCP channel, and a host address of the HTTP channel; and
exchange the host addresses of the three types of channels of the local client host and the collected two types of addresses, with host addresses of the three types of channels of the peer client host and the two types of addresses collected by the peer client host, and match the host addresses of the three types of channels of the local client host and the collected two types of addresses, with host addresses of the three types of channels of the peer client host and the two types of addresses collected by the peer client host.

6. The client host according to claim 5, wherein the processor is further configured to:
exchange the host address of the UDP channel of the local client host, the host address of the TCP channel of the local client host, the host address of the HTTP channel of the local client host, the mapping address that is collected by the local client host and that is allocated by the network address translation NAT host at the outermost layer of each channel in the at least one channel, and the relay address that is of the local relay device and that is collected by the local client host, with a host address of the UDP channel of the peer client host, a host address of the TCP channel of the peer client host, a host address of the HTTP channel of the peer client host, a mapping address that is collected by the peer client host and that is allocated by a NAT host at an outermost layer, and a relay address that is of a peer relay device and that is collected by the peer client host; and match the host address of the UDP channel of the local client host, the host address of the TCP channel of the local client host, the host address of the HTTP channel of the local client host, the mapping address that is collected by the local client host and that is allocated by the network address translation NAT host at the outermost layer of each channel in the at least one channel, and the relay address that is of the local relay device and that is collected by the local client host, with a host address of the UDP channel of the peer client host, a host address of the TCP channel of the peer client host, a host address of the HTTP channel of the peer client host, a mapping address that is collected by the peer client host and that is allocated by a NAT host at an outermost layer, and a relay address that is of a peer relay device and that is collected by the peer client host.

7. The client host according to claim 6, wherein the processor is further configured to:
detect connectivity of a UDP channel between the host address of the UDP channel of the local client host and the host address of the UDP channel of the peer client host, wherein the host address of the UDP channel of the local client host and the host address of the UDP channel of the peer client host are matched; and
when the UDP channel is connected successfully, select the UDP channel as a channel that has a highest priority when the local client host and the peer client host perform data interaction.

8. A relay device, comprising:
a memory that stores instructions; and
a processor coupled to the memory and configured to execute the instructions to:
receive an address detection request sent by a local client host,
collect, according to a packet type of the address detection request, two types of addresses corresponding to the packet type, wherein the two types of addresses comprise a mapping address allocated by a network address translation NAT host at an outermost layer and a relay address of the relay device which serves as a local relay device;
send, to the local client host, the two types of addresses which correspond to the packet type and are collected by the address collecting unit, so that the local client host and a peer client host perform address exchange and address matching, and the local client host perform, based on matched addresses, channel connectivity detection and select a channel with a highest priority from channels on which connectivity detection is successful for data interaction with the peer client host;
receive data in a UDP format sent by a peer relay device;
determine a channel with a highest priority between the local relay device and the local client host;
when the channel with the highest priority between the local relay device and the local client host is a non-UDP channel, convert the data from the UDP format to a format corresponding to the channel with the highest priority; and
send data in a converted format to the local client host.

* * * * *